A. H. Burdine,
Sharpening Reciprocating Saws.
Nº 21,483. Patented Sep. 14, 1858.
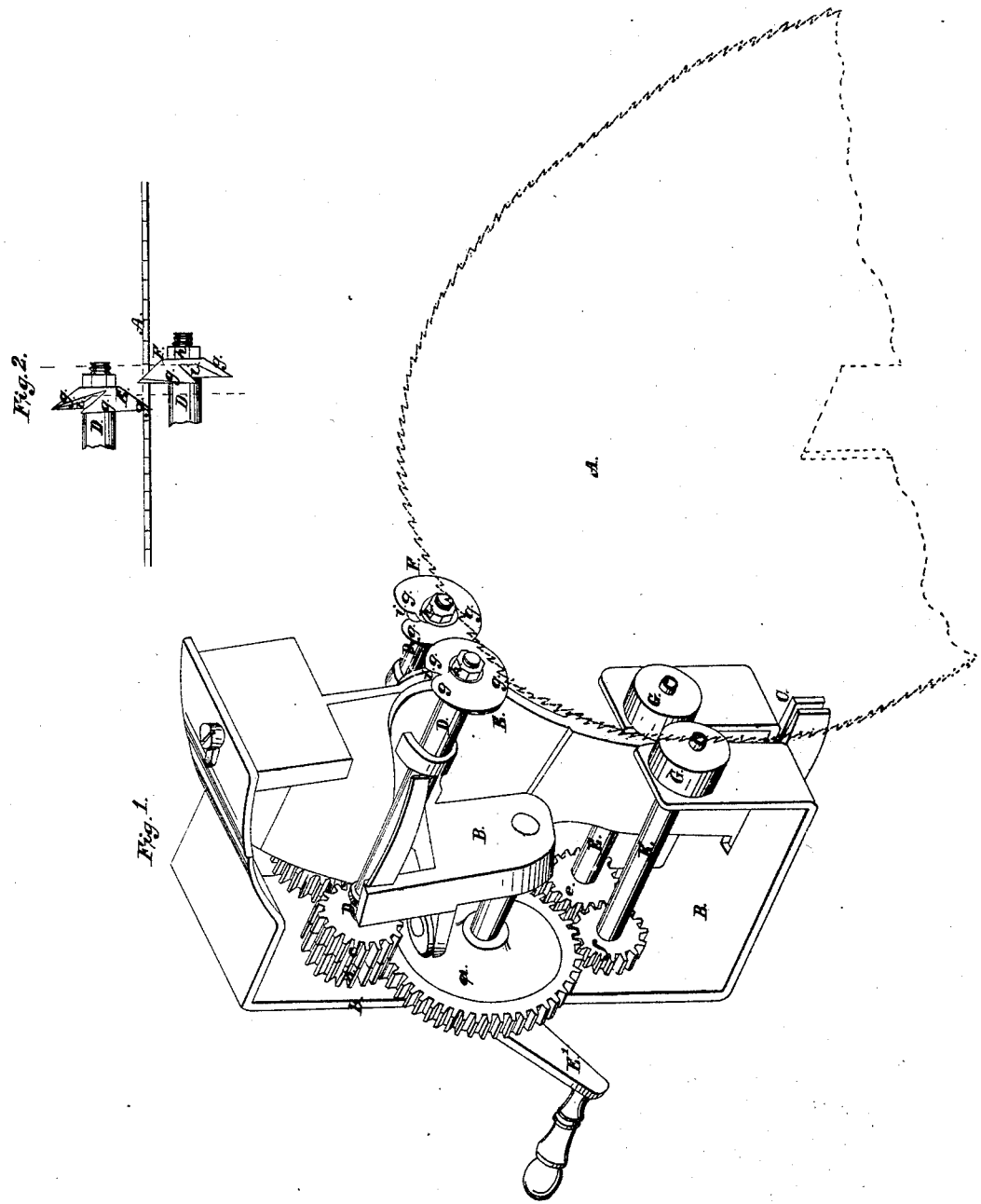

UNITED STATES PATENT OFFICE.

A. H. BURDINE, OF CHULAHOMA, MISSISSIPPI.

SAW-FILER.

Specification of Letters Patent No. 21,483, dated September 14, 1858.

*To all whom it may concern:*

Be it known that I, A. H. BURDINE, of Chulahoma, in the county of Marshall and State of Mississippi, have invented a new and useful Improvement in Machines for Filing Old Cotton-Gin and other Saws; and I do hereby declare that the following is a full, clear, and exact description of the same, reference being had to the accompanying drawings, forming a part of this specification, in which—

Figure 1, is a perspective view of my improved saw filing machine. Fig. 2, is a detached view of a portion of the machine.

Similar letters of reference, in each of the several figures indicate corresponding parts.

The nature of my invention consists 1st, in a file constructed spirally on a revolving axis so that a space exists between the two ends of the spiral or screw thread constituting the file. This construction of file serving the double office of filing and feeding the saw at one and the same time, in a very regular and perfect manner, as will be presently set forth, and thus rendering saw filing machines exceedingly simple.

It consists, 2nd, in the combination in the manner hereinafter specified of one or two of the above specified files with two conical rotating files in a machine of the character hereinafter specified for the especial purpose of filing old cotton gin saws.

To enable others, skilled in the art, to make and use my invention, I will proceed to describe its construction and operation.

A, in the accompanying drawing represents a cotton gin saw. B, a frame constructed with a guide C, which receives and steadies the saw as shown. In the upper part of the frame B, I arrange two rotating and laterally yielding shafts D, D, and in the lower part two rotating rigid shafts E, E, as shown in the drawing. These two sets of shafts, I combine by means of cog gearing a, b, c, d, e, f, &c., so that they shall all move together by the turning of the crank E'; those of the upper set in an opposite direction to each other and those of the lower set in a similar manner.

On the front ends of the shafts D, D, I arrange two of my spiral files F, F', so that one shall stand the distance of one saw tooth in advance of the other, and thus effect the feeding of the saw by two teeth as presently described.

My improved files F, F, are formed by cutting a spiral flanch or screw thread $g$, on a hub or hollow axis $h$, in such a manner that a space $i$, shall exist between the two terminating ends of the spiral flanches or screw thread as shown in the drawing. Having thus constructed the spiral flanch or screw its front or convex face is granulated or made rough like an ordinary file as represented, or in any manner which may be necessary to suit the work to be performed. And on the front ends of the lower shafts E, E, I arrange, side by side, two conical or taper files G, G, as shown.

Instead of using two files F, F', one of the spiral flanches only might be granulated and the other left plane. By this arrangement the succeeding spiral flanch F', would only act as a feeding device and thus avoid refiling the saw teeth. Or if desirable, the spiral flanch F', may be dispensed with entirely and only the spiral file F, employed. In this case, the location of the file could advantageously be changed to a position directly over the space existing between the two conical files.

From the foregoing description and the following, the operation will be understood. The machine is placed on the gin saw so that the teeth of the saw come between the jaws of the guide C, and between the conical or taper files and the spiral files F, F', as shown in red. All being arranged the crank E', is turned and the shafts D, D, and E, E, set in motion. As the shafts D, D, revolve, they carry the spiral files around and the terminating ends of the spiral flanches take successively into the spaces existing between the teeth, and owing to the flanches being granulated the saw teeth are filed down to the extent desired, and at the same time owing to the flanches being spiral, the saw is crowded around the proper distance to bring a new one of the spaces between the teeth in proper position for the entrance of the other end of the spiral file into it, as illustrated in Fig. 2, of the drawing by red lines. Thus the operation continues without interruption until the saw is finished all around; simultaneously with the filing out of the teeth, the sides of the same are filed off by the conical files until the teeth are tapered to a point.

The within described machine is very simple and although represented and described as being especially designed for filing old circular cotton gin saws, it is evident that by a modification of the frame, the same character of spiral file as herein specified can be advantageously used for filing and feeding straight and circular saws, used in sawing lumber, &c.

What I claim as my invention and desire to secure by Letters Patent is—

1. A file F, constructed spirally on a revolving axis $h$, so that a space $i$, exists between the two ends of the spiral or screw thread constituting the file, substantially as and for the purposes set forth.

2. The combination of one or two of the above specified files F, with two conical rotating files G, G, in a machine of the character specified, substantially as and for the purposes set forth.

The above specification of my improvement in gin saw sharpeners signed by me this 10th day of August 1858.

A. H. BURDINE.

Witnesses:
 G. YORKE AT LEE,
 H. H. YOUNG.